(12) United States Patent
Maeda et al.

(10) Patent No.: US 7,949,180 B2
(45) Date of Patent: May 24, 2011

(54) NON-TRANSITORY COMPUTER READABLE MEDIUM FOR IMAGE PROCESSING SEARCHING COLORED REGIONS FOR REGION SATISFYING SEARCHING CONDITION, AND IMAGE-PROCESSING APPARATUS FOR PERFORMING THE IMAGE PROCESSING

(75) Inventors: Aki Maeda, Kanagawa (JP); Yasuaki Mitobe, Kanagawa (JP); Fumio Takatani, Kanagawa (JP); Kazuya Hashimoto, Kanagawa (JP); Kazunori Kurokawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1082 days.

(21) Appl. No.: 11/783,237

(22) Filed: Apr. 6, 2007

(65) Prior Publication Data

US 2008/0025648 A1    Jan. 31, 2008

(30) Foreign Application Priority Data

Jul. 31, 2006   (JP) ................. 2006-208826

(51) Int. Cl.
   *G06K 9/00*    (2006.01)
(52) U.S. Cl. ........ 382/162; 382/163; 382/164; 382/167; 382/275
(58) Field of Classification Search ............ None
   See application file for complete search history.

(56) References Cited

U.S. PATENT DOCUMENTS

| | | | | |
|---|---|---|---|---|
| 6,711,287 | B1 * | 3/2004 | Iwasaki | 382/165 |
| 2002/0041705 | A1 * | 4/2002 | Lin et al. | 382/165 |
| 2003/0083850 | A1 * | 5/2003 | Schmidt et al. | 702/189 |
| 2005/0013599 | A1 * | 1/2005 | Nakanishi et al. | 396/2 |
| 2007/0127775 | A1 * | 6/2007 | Moon et al. | 382/103 |

FOREIGN PATENT DOCUMENTS

| | | |
|---|---|---|
| JP | A 6-30252 | 2/1994 |
| JP | A 2002-342038 | 11/2002 |
| JP | A 2004-179843 | 6/2004 |

OTHER PUBLICATIONS

Phung et al. Skin Segmentation Using Color And Edge Information, 2003 IEEE, 525-528.*
Kaiser, Using Photoshop Selection Tools, WebsiteTips.com, Mar. 2006.*
Golding, SAMS Teach Yourself Adobe® Creative Suite 2 All in One, Chapter 5: Using Adobe Photoshop CS2, Section: Working with Selections, Jul. 1, 2005, Sams, pp. 1-25.*

* cited by examiner

*Primary Examiner* — Sath V Perungavoor
*Assistant Examiner* — Jason Heidemann
(74) *Attorney, Agent, or Firm* — Oliff & Berridge, PLC

(57) ABSTRACT

A computer readable medium stores a program causing a computer to execute image process, wherein the image process includes accepting image information, accepting a searching condition, specifying colored regions in an image produced by the image information, searching the specified regions for a region satisfying the searching condition, and outputting information on the region satisfying the searching condition.

16 Claims, 4 Drawing Sheets

FIG. 1
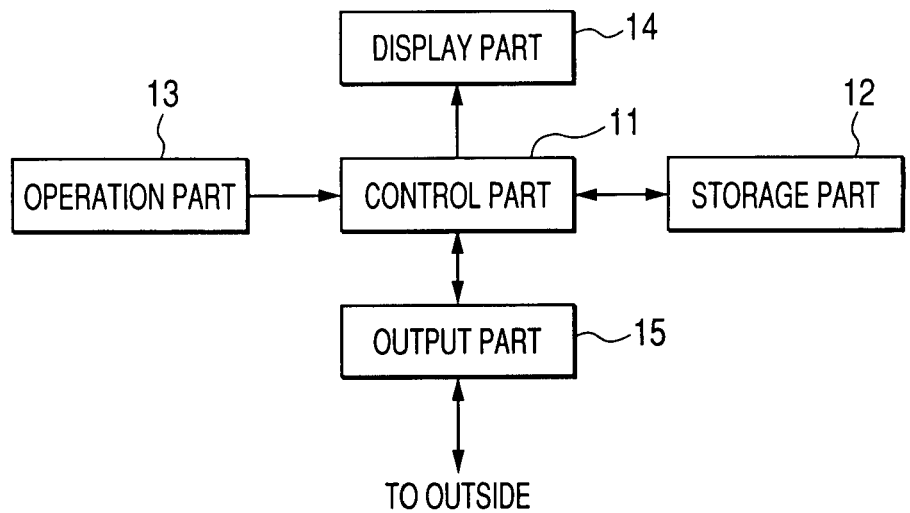
FIG. 2
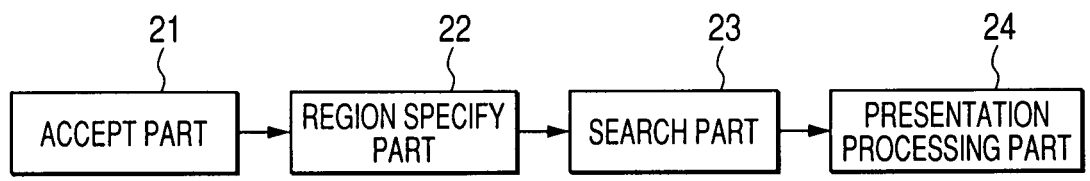
FIG. 3
| COLOR | | | | AREA (NUMBER OF PIXELS) |
|---|---|---|---|---|
| C: 10% | M: 0% | Y: 5% | K: 0% | 200 |
| C: 20% | M: 20% | Y: 0% | K: 30% | 26,000 |
| ⋮ | | | | ⋮ |

US 7,949,180 B2

NON-TRANSITORY COMPUTER READABLE MEDIUM FOR IMAGE PROCESSING SEARCHING COLORED REGIONS FOR REGION SATISFYING SEARCHING CONDITION, AND IMAGE-PROCESSING APPARATUS FOR PERFORMING THE IMAGE PROCESSING

CROSS-REFERENCE TO RELATED APPLICATIONS

This application is based on and claims priority under 35 USC 119 from Japanese Patent Application No. 2006-208826 filed on Jul. 31, 2006.

BACKGROUND

1. Technical Field

The present invention relates to a computer readable medium storing a program causing a computer to execute image process, a computer data signal embodied in a carrier wave for enabling a computer to perform the image process, and an image-processing apparatus.

2. Related Art

As regards characters used in an animation, in some cases, on the assumption that the characters are applied to related goods, the skin colors of the characters and the colors of clothes of the characters are specified. For example, when designing a handkerchief with the characters printed thereon, in some cases, colors relating to the characters cannot be changed due to the relation with the copy holder of such characters.

By the way, when applying a textile printing onto a handkerchief and the like, even in the case of process colors, a plate must be formed for each of the colors. For example, when using seven colors including process colors and special colors, printing is executed using seven plates.

On the other hand, when a designer drafts a design using a personal computer or the like, the designer tries to use a process color similar to a special color and, after then, the designer may happen to forget the trial of the process color and leave it as it is. In this case, besides a special color plate, a plate of this process color is also formed, thereby increasing the number of plates while the designer is unconscious of this.

Also, when a special color specified is changed in part to a process color due to the wrong operation of the personal computer, there occurs a similar incident.

SUMMARY

According to an aspect of the invention, there is provided a computer readable medium storing a program causing a computer to execute image process, wherein the image process includes accepting image information, accepting a searching condition, specifying colored regions in an image produced by the image information, searching the specified regions for a region satisfying the searching condition, and outputting information on the region satisfying the searching condition.

BRIEF DESCRIPTION OF THE DRAWINGS

Exemplary embodiment(s) of the present invention will be described in detail based on the following figures, wherein:

FIG. 1 is a block diagram of an example of the structure of an image-processing apparatus according to an exemplary embodiment of the invention;

FIG. 2 is a functional block diagram of an example of an image-processing apparatus according to an exemplary embodiment of the invention;

FIG. 3 is an explanatory view of an example of information about regions to be generated by an image-processing apparatus according to an exemplary embodiment of the invention;

DETAILED DESCRIPTION

Figure 4:
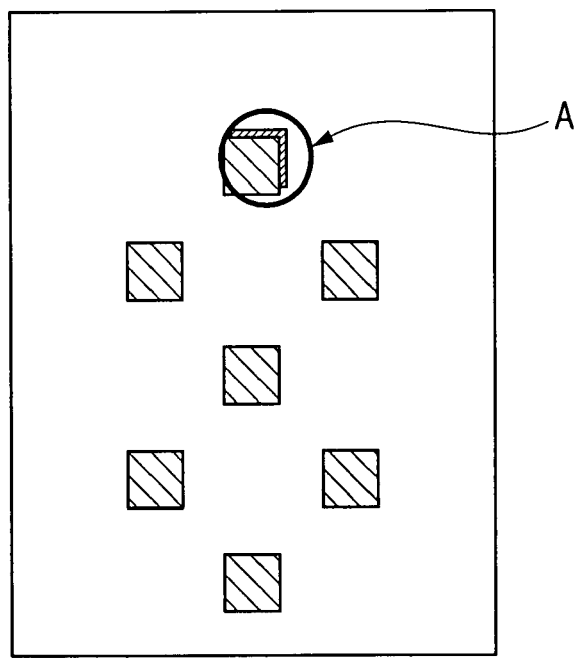
FIG. 4 is an explanatory view of an example of a presentation image to be presented by an image-processing apparatus according to an exemplary embodiment of the invention.

Now, description will be given below of an image-processing apparatus according to an exemplary embodiment of the invention with reference to the accompanying drawings. An image-processing apparatus according to the exemplary embodiment of the invention, as shown in FIG. 1, includes a control part 11, a storage part 12, an operation part 13, a display part 14, and an output part 15.

The control part 11 is a program control device such as a CPU and can be operated according to a program stored in the storage part 12. This control part 11 executes not only a processing functioning as plotting software to be used by a designer but also a processing which detects regions colored in colors included in an image plotted by such plotting software and notifies a user such as the designer of a region satisfying a given condition of the detected colored regions. The processings to be executed by the control part 11 will be described later in detail.

The storage part 12 is a storage medium which holds programs to be executed by the control part 11. For example, this storage part 12 includes a memory element such as a RAM (Random Access Memory) and serves also as the work memory of the control part 11.

The operation part 13 is a keyboard, a mouse, or the like and, when it is operated by the user, it outputs to the control part 11 a signal expressing the contents of this user operation. The display part 14 is a display or the like and, according to an instruction inputted from the control part 11, displays information or an image.

The output part 15 is an external storage medium drive such as a network interface or a CD-R (Compact Disc Recordable) and transmits information inputted from the control part 11 to the outside or records such information in a portable-type medium.

Here, description will be given below of the contents of the processings of the control part 11. The image-processing apparatus according to the present exemplary embodiment of the invention, because of the software-like processing of the control part 11, functionally, has such a structure as shown in FIG. 2. That is, the image-processing apparatus according to the present exemplary embodiment includes an accept part 21 for accepting image information serving as a target to be processed, a region specify part 22 which, in an image expressed by the image information serving as the target to be processed, divides and specifies regions to be colored by colors used, a search part 23 which searches the thus specified regions for a region satisfying a given condition, and a presentation processing part 24 which executes a notifying processing to the user using the search result obtained by the search part 23.

As described above, according to the present exemplary embodiment, the control part 11 executes the processing as the plotting software and generates the image information. Here, the term "plotting software" means a type of software that, for example, according to the instructive operation of a user, plots a figure such as a line or a curve in a specified color to thereby generate information about the resultant image. Here, the image information may be information about the colors of individual pixels arranged lengthwise and breadthwise as bit map data, or coordinate information or color information for regulating a figure as vector data such as a postscript (registered trade mark).

The accept part 21 accepts the image information generated in the plotting software as a target to be processed and outputs it to the region specify part 22. The region specify part 22, with respect to the respective colors used in the image information, specifies regions where the respective colors are used. As an example of the operations thereof, the region specify part 22, when it has accepted vector data as the image information, executes a rasterizing processing based on the vector data to thereby generate bit map data. The region specify part 22 checks the respective pixels of the thus generated bit map data for the colors thereof and counts the number of pixels by colors contained in the bit map data (which corresponds to the area of a region colored in their respective colors in the bit map data). And, by colors contained in the bit map data, the numbers of pixels colored in such colors are linked to each other to thereby generate region information, and the region information is stored into the storage part 12 (FIG. 3).

Here, description has been given of the example in which the control part 11 carries out the rasterizing processing. However, for example, when the present image-processing apparatus is connected to a server which enforces a rasterizing processing based on image information to thereby generate an image for printing, the control part 11 may obtain the rasterized result (the rasterized result in printing) from the server to thereby obtain the bit map data. Also, when the image information is bit map data, it is not necessary to enforce a rasterizing processing.

The search part 23 refers to the region information stored in the storage part 12 and searches for the region that satisfies a preset condition. For example, the search part 23 searches for the regions on the condition that "the area (the number of pixels) of the region goes below a preset threshold value" and, as a result of such search, finds a region satisfying such condition and outputs information about the thus found region to the presentation processing part 24. Here, the region information to be outputted by the search part 23 is information which expresses the color of the region satisfying the condition.

The presentation processing part 24, when the information about the region is inputted thereto from the search part 23, generates an image (presentation image) expressing the thus inputted region and displays the image on the display part 14. The presentation image is, for example, a synthetic image which is obtained when, of bit map data, circular, rectangular and other figure images (A) surrounding pixels colored in a color inputted as the region information are synthesized to bit map data (FIG. 4).

Figure 5:
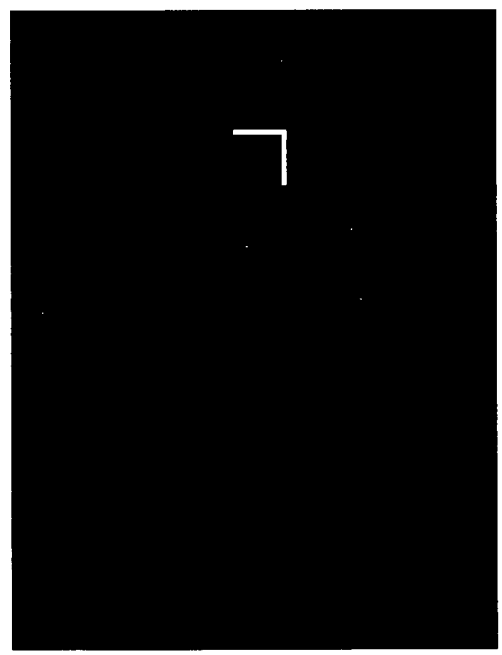
FIG. 5 is an explanatory view of another example of a presentation image to be presented by an image-processing apparatus according to an exemplary embodiment of the invention.

Also, of bit map data, pixels not colored in a color inputted as the region information may be colored in a given color, pixels colored in a color inputted as the region information may be colored in a color having a strong contrast to the given color to thereby generate a presentation image, and the thus generated presentation image may be displayed on the display part 14. For example, as shown in FIG. 5, pixels colored in a color inputted as the region information may be expressed as a white color and other pixels may be expressed as a black color.

Here, as the region the area of which goes below the threshold value, there has been searched for the region in which the number of pixels itself (the absolute area of pixels) goes below the threshold value. However, the ratios of the numbers of pixels (areas) of the respective regions to the number of pixels of the whole image may be obtained, and then a region, which is smaller in such ratio than a preset threshold value (a specific ratio), may be searched for.

Figure 6:
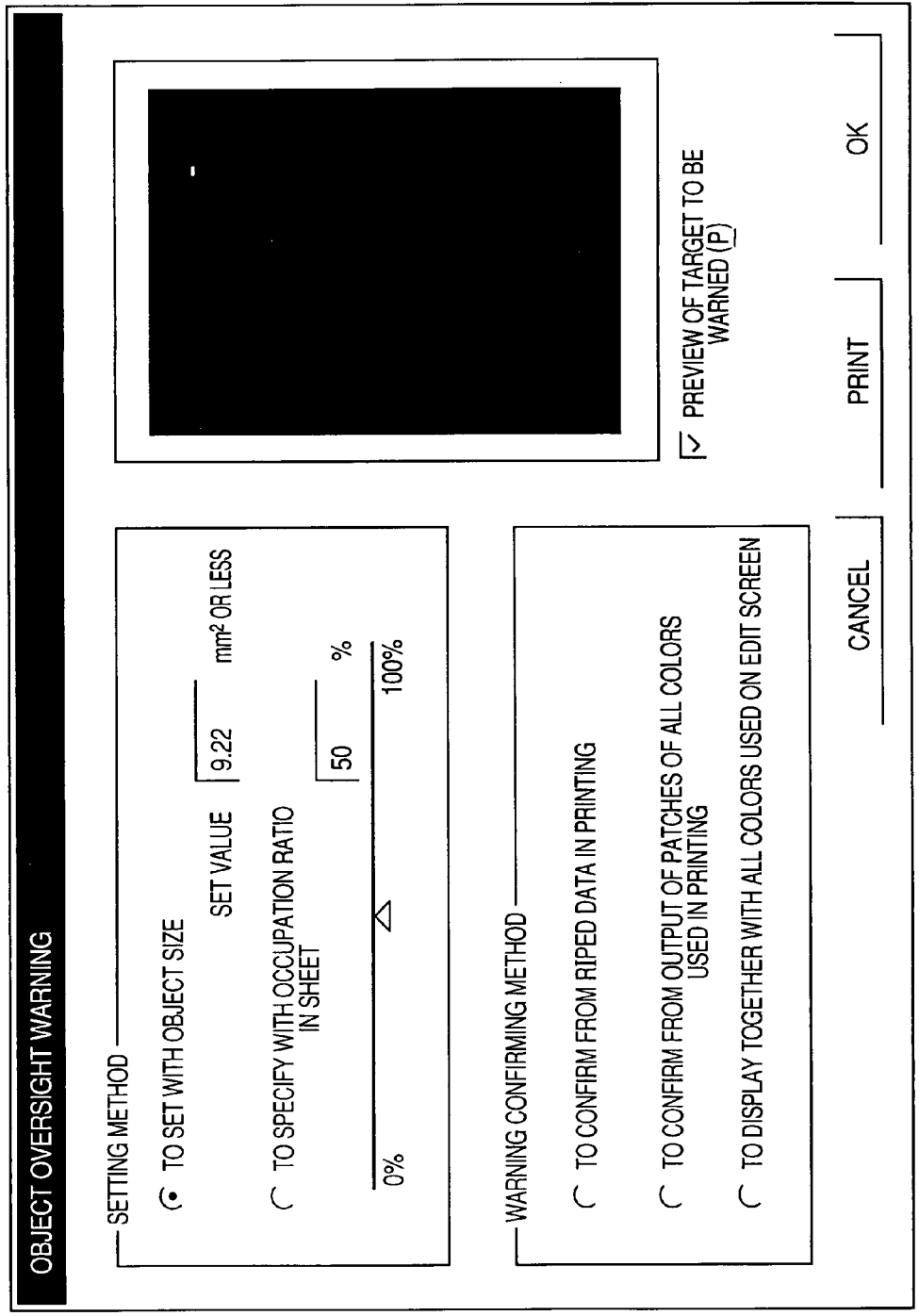
FIG. 6 is an explanatory view of an example of a user interface to be provided by an image-processing apparatus according to an exemplary embodiment of the invention.

Also, the control part 11, as shown in FIG. 6, may display the threshold value as a condition for search in the search part 23 on an interface (P) to be accepted from a user or an interface (Q) for specifying a notifying method. At the then time, such presentation image as shown in FIGS. 4 and 5 may be displayed together with the threshold value as a preview (R). Thus, the presentation image may be displayed as an image which is reduced in size when compared with an actual image.

Here, in the interface for accepting the searching condition, as shown in FIG. 6, it can be selected whether the searching condition is specified by the absolute value of the number of pixels (area) after generation of bit map data, or by the area ratio of a region to the whole of the image information or to the area of a sheet on which the image information is formed; and also, the respective set values can be set into a numeric value input column or can be set using a slider. By the way, here, there is shown the example in which the area value (square millimeters) is specified as the absolute value; and, this area value can be compared with the number of pixels contained in a region using the resolution (which is expressed by the number of pixels per inch or the like) of the bit map data which is generated by the region specify part 22.

Further, in the interface shown in FIG. 6, as the notifying method, there can be selected any one of the following methods.

(1) A method for notifying specific information using the rasterized data;

(2) A method for notifying specific information by outputting all color patches used in printing; and, (3) A method for notifying specific information together with a list of all colors used in the image in combination with the screen of the image plotting software.

Of these methods, (1) to notify specific information using the rasterized data unit, as described above, to display and output the presentation image shown in FIG. 4 or 5, or to print the presentation image. Also, when (2) "to notify specific information by outputting all color patches used in printing" is selected, the control part 11, on receiving an instruction for printing, generates an image containing the respective color patches used in information about an image to be processed. Here, the patches are formed each in a rectangular or similar shape of a given size and are colored in their respective colors. Further, the control part 11, in the thus generated image, displays selectively and emphatically the patch of a color used to color a region specified by the processing of the search part 23. The emphatic display method includes specifically, for example, a method for displaying a frame surrounding the periphery of the patch of the color to be displayed emphatically, and a method for displaying the patch of such color together with a character string such as "information to be notified".

In the case of (3) "a method for notifying specific information together with a list of all colors used in the image in combination with the screen of the image plotting software", the control part 11 generates a list of colors used in information about an image to be processed and, of this list, displays selectively and emphatically a color which is used to color a region specified by the information that is outputted by the search part 23. As the specific example of the emphatic display method of this type, there are available a method for displaying a frame surrounding the periphery of a color to be emphatically displayed, and a method for displaying the color to be emphasized together with a character string such as "information to be notified".

Also, the region searching condition used by the search part 23 may also be the condition that "a region to be colored in a color belonging to the range of a color specified" is to be searched for. In this case, the control part 11 accepts, as a attention color, one of colors contained in an image to be expressed by image information to be processed. For example, in the plotting software, a user is allowed to instruct a point on an image being plotted, a color at the thus instructed point is regarded as a attention color, and there is obtained information that expresses this attention color. Here, the information expressing the attention color may also be expressed by, for example, a process color space (a color space regulated by four colors, that is, cyan (C), magenta (M), yellow (Y) and black (K)) in printing.

The control part 11 regards, as colors to be searched for, colors existing in the range of the distance specified by a user with the specified attention color as the center thereof in a given color space such as the above-mentioned CMYK color space. And, as the processing of the search part 23, the control part 11 refers to the region information stored in the storage part 12 and searches for regions colored in colors existing in the range to be searched for. As a result of this search, the control part 11, specifically, the search part 23 outputs information about the region satisfying the searching condition to the presentation processing part 24. In this case as well, the region information to be outputted by the search part 23 may be, for example, the information that expresses the color of the region satisfying the searching condition.

Here, the colors existing in the range of the specified distance in a given color space with the color specified as the attention color as the reference thereof are regarded as colors to be searched for. However, colors existing in ranges specified by color components in a given color space may also be regarded as colors to be searched for. For example, the ranges of the respective components, that is, hue (H), chroma (S) and lightness (S) may be specified, and colors existing in the thus specified ranges may be regarded as colors to be searched for. In this case as well, the control part 11, as the processing of the search part 23, refers to the region information stored in the storage part 12 and searches for regions respectively colored in colors existing in the range to be searched for. And, as a result of this retrieval, the search part 23 outputs information about the region satisfying the searching condition to the presentation processing part 24. In this case as well, the region information to be outputted by the search part 23 may be, for example, the information that expresses the colors of the region satisfying the searching condition.

Figure 7:
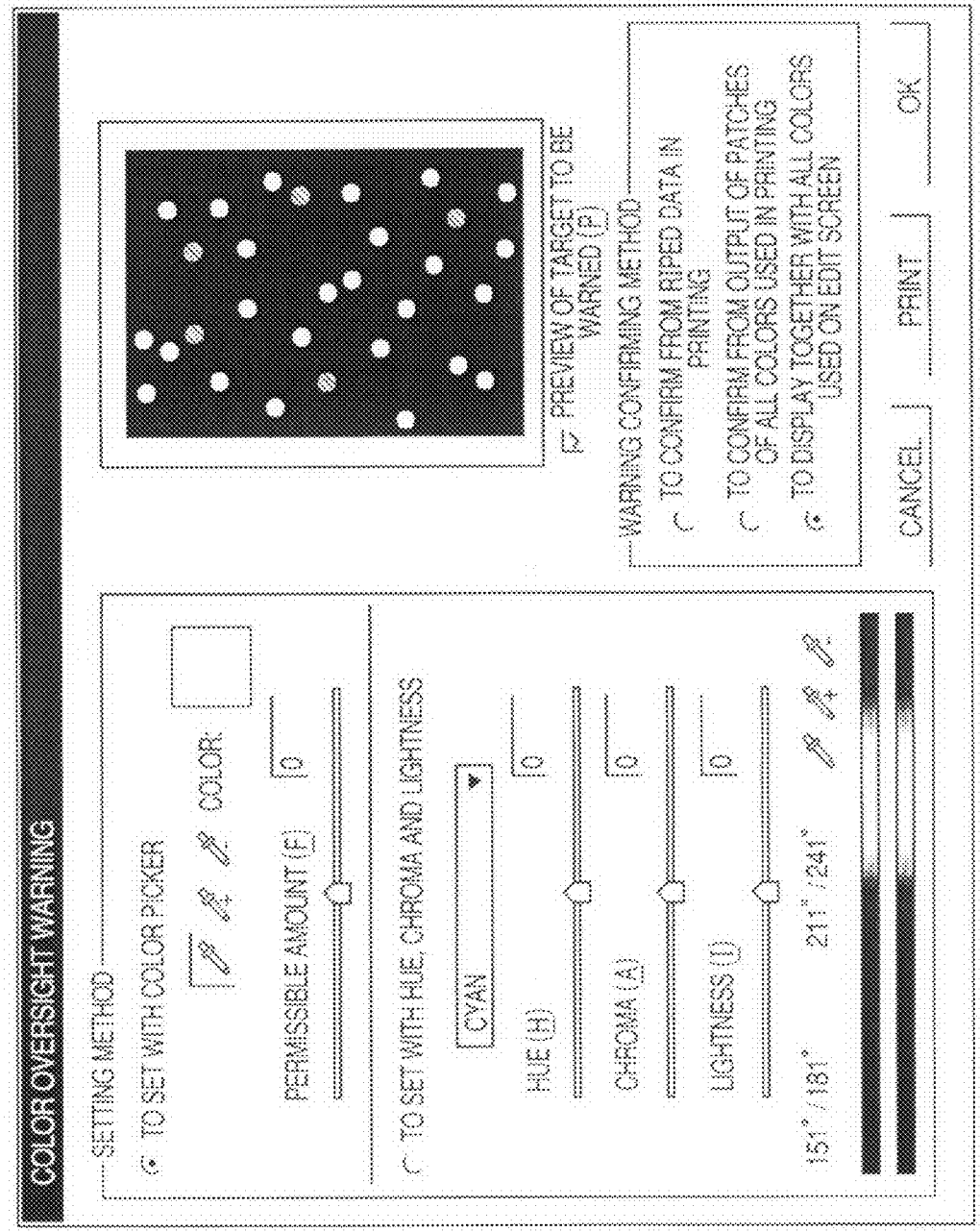
FIG. 7 is an explanatory view of another example of a user interface to be provided by an image-processing apparatus according to an exemplary embodiment of the invention, wherein 11 denotes Control part; 12 denotes Storage part; 13 denotes Operation part; 14 denotes Display part; 15 denotes Output part; 21 denotes Accept part; 22 denotes Region specify part; 23 denotes Search part; and 24 denotes Presentation processing part.

As described above, when retrieving a region colored in colors existing in a range specified, the control part 11 provides a user with an interface, for example, such an interface as shown in FIG. 7.

In FIG. 7, in a "setting by color picker" method, as a color picker, a mouse cursor with a syringe pattern is moved to obtain the color of a notable pixel; and, in this case, of the image information to be processed, a pixel overlapping with the leading end portion of the syringe (hot spot) is regarded as the notable pixel. The thus obtained color may be displayed within an adjoining rectangular region (X). Also, here, as the "permissible amount", the distance in a color space is set by a slider (Y).

Further, when specifying the range according to the components of a color, the range of the values of the respective color components such as the hue, chroma and lightness within a color space is specified by a slider or the like (Z). Here, by selecting a predetermined color name or system name (such as "a cyan system" or "a magenta system") from a menu, the initial position of the slider may be decided. In this case, the values of the initial positions of the respective sliders are stored into and held in the storage part 12 while they are linked to the color name or system name; and, the control part 11, while referring to the value linked to the color name or system name specified by a user, sets the values of the sliders.

Setting of a notifying method and the like are similar to the above-mentioned setting. Also, the control part 11 may generate, as a presentation image, an image in which the region thereof colored in a color not belonging to the specified range is plotted using a given color and the region thereof colored in a color belonging to the specified range is plotted using a color different from the given color; and then, the control part 11 may outputs and displays the thus generated image.

In this case, when the range to be searched for is determined by the attention color and the distance from the attention color, the plotting color of the region colored in the color belonging to the specified range may also be decided by the distance from the attention color. For example, the region colored in the color not belonging to the specified range may be plotted in a black color, the attention color may be a while color, and the remaining regions may also be plotted in a color which becomes grey deeper and deeper as the distance from the attention color increases (see FIG. 7).

In cases where a list of colors is displayed, when emphatically displaying a color which is used in a region searched for, as a result of the search, of colors existing in a range specified as a target to be searched for, other colors than the attention color may also be emphatically displayed together with a character string "information to be notified". As a result of this, another color existing in a determined distance range within a given color space with respect to the attention color is presented to a user.

Further, according to the present exemplary embodiment, in the interface shown in FIG. 6 or 7, each time a user changes the searching condition, the control part 11 may also carries out the processing of the search part 23 and the processing of the presentation processing part 24 repeatedly. In other words, when the user updates the searching condition, correspondingly to such update (that is, in a real-time manner), the display of the retrieval result may be updated.

In this manner, according to the present exemplary embodiment, in the image information that the user has created using the plotting software, a color the colored area of which is lower than a given lower limit value is presented to the user, or two or more mutually different colors existing in a given range are presented to the user.

In an image-processing apparatus according to the present exemplary embodiment, description has been given heretofore of an example in which the plotting software is operated in combination with the present apparatus. However, the image-processing apparatus according to the present exemplary embodiment may also work as a printer server: that is, it receives image information plotted according to plotting software as the information to be print processed through a communication line such as a network, and regards the image information as a target to be processed; it divides the image information to be processed into regions according to colors used; it searches the thus divided regions for a region the area of which satisfies a specified condition or a region in which a color used to color it belongs to a specified range; and, as a result of the retrieval, it presents the user with the thus found region. In this case, the control part 11 does not execute the processing as the plotting software but executes a processing for outputting the image information to a printer or the like.

What is claimed is:

1. A non-transitory computer readable medium storing a program causing a computer to execute image process, the image process comprising:
   accepting image information;
   accepting a searching condition;
   specifying colored regions in an image produced by the image information;
   searching the specified regions for a region satisfying the searching condition; and
   outputting information on the region satisfying the searching condition, wherein specifying colored regions comprises:
   specifying a color of each of the colored regions; and
   specifying a total area of each color.

2. The non-transitory computer readable medium according to claim 1,
   wherein the accepting the searching condition comprises accepting a threshold value; and
   the searching the specified regions for the region satisfying the searching condition comprises selecting a region whose area is smaller than the threshold value or selecting a region whose ratio of its area to an area of the image is smaller than the threshold value.

3. The non-transitory computer readable medium according to claim 1,
   wherein the accepting the searching condition comprises accepting a color range; and
   the searching the specified regions for a region satisfying the searching condition comprises selecting a region whose color is within the color range.

4. The non-transitory computer readable medium according to claim 3,
   wherein the accepting the color range comprises:
   accepting an attention color that is one of colors used in the image; and
   accepting a distance from the attention color in a given color space, and
   wherein the color range is defined by colors which are within the accepted distance from the accepted attention color.

5. The non-transitory computer readable medium according to claim 4,
   wherein outputting information on the region satisfying the searching condition comprises:
   coloring a region whose color is not within the color range in a single color and the region whose color is within the color range in other colors which are different from each other in accordance with the distance form the attention color; and
   presenting the colored image.

6. The non-transitory computer readable medium according to claim 3,
   wherein the accepting the color range comprises:
   accepting a range of each of color components in a given color space.

7. The non-transitory computer readable medium according to claim 1,
   wherein outputting information on the region satisfying the searching condition comprises:
   adding to the original image a symbol that indicates the region satisfying the searching condition; and
   presenting the symbol-added image.

8. The non-transitory computer readable medium according to claim 1,
   wherein outputting information on the region satisfying the searching condition comprises:
   coloring a region that does not satisfy the searching condition in a single color and the region that satisfies the searching condition in another single color; and
   presenting the colored image.

9. An image-processing apparatus comprising:
   an image-information-accepting unit that accepts image information;
   a searching-condition-accepting unit that accepts a searching condition;
   a specifying unit that specifies colored regions in an image produced by the image information;
   a processor that searches the specified regions for a region satisfying the searching condition; and
   an outputting unit that outputs information on the region satisfying the searching condition, wherein
   the specifying unit comprises:
   a color-specifying unit that specifies a color of each of the colored regions; and
   an area-specifying unit that specifies a total area of each color.

10. The image-processing apparatus according to claim 9,
    wherein the searching-condition-accepting unit comprises a threshold-value-accepting unit that accepts a threshold value; and
    the processor comprises a selecting-by-area unit that selects a region whose area is smaller than the threshold value or a selecting-by-ratio unit that selects a region whose ratio of its area to an area of the image is smaller than the threshold value.

11. The image-processing apparatus according to claim 9,
    wherein the searching-condition-accepting unit comprises a color-range-accepting unit that accepts a color range; and
    the processor comprises a selecting-by-color unit that selects a region whose color is within the color range.

12. The image-processing apparatus according to claim 11,
    wherein the color-range-accepting unit comprises:
    an attention-color-accepting unit that accepts an attention color that is one of colors used in the image; and
    a distance-accepting unit that accepts a distance from the attention color in a given color space, and
    wherein the color range is defined by colors which are within the accepted distance from the accepted attention color.

13. The image-processing apparatus according to claim 12,
    wherein the outputting unit comprises:

a coloring unit that colors a region whose color is not within the color range in a single color and the region whose color is within the color range in other colors which are different from each other in accordance with the distance form the attention color; and a presenting unit that presents the colored image.

14. The image-processing apparatus according to claim 11, wherein the color-range-accepting unit comprises:

a color-component-accepting unit that accepts a range of each of color components in a given color space.

15. The image-processing apparatus according to claim 9, wherein the outputting unit comprises:

an adding unit that adds to the original image a symbol that indicates the region satisfying the searching condition; and a presenting unit that presents the symbol-added image.

16. The image-processing apparatus according to claim 9, wherein the outputting unit comprises:

a coloring unit that colors a region that does not satisfy the searching condition in a single color and the region that satisfies the searching condition in another single color; and a presenting unit that presents the colored image.

* * * * *